(12) United States Patent
Edwin et al.

(10) Patent No.: US 9,478,006 B2
(45) Date of Patent: Oct. 25, 2016

(54) CONTENT AWARE CROPPING

(71) Applicant: Adobe Systems Incorporated, San Jose, CA (US)

(72) Inventors: Anand Samuel Edwin, Bangalore (IN); Komal Kumar Desai, Noida (IN); Charan Raj, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 284 days.

(21) Appl. No.: 14/228,974

(22) Filed: Mar. 28, 2014

(65) Prior Publication Data

US 2015/0278986 A1    Oct. 1, 2015

(51) Int. Cl.
| | | |
|---|---|---|
| *G06T 17/00* | (2006.01) | |
| *G06T 3/00* | (2006.01) | |
| *G06T 11/40* | (2006.01) | |
| *G06F 3/0484* | (2013.01) | |
| *G06T 3/40* | (2006.01) | |

(52) U.S. Cl.
CPC ......... *G06T 3/0012* (2013.01); *G06F 3/04842* (2013.01); *G06F 3/04845* (2013.01); *G06T 3/4023* (2013.01); *G06T 11/40* (2013.01); *G06T 2210/22* (2013.01); *G06T 2210/36* (2013.01)

(58) Field of Classification Search
CPC .. G06T 3/0012; G06T 11/40; G06T 2210/22
See application file for complete search history.

(56) References Cited

U.S. PATENT DOCUMENTS

| | | | | |
|---|---|---|---|---|
| 6,741,262 B1 * | 5/2004 | Munson | ................... | H04N 1/60 345/590 |
| 8,214,766 B1 * | 7/2012 | Berger | ................ | G06F 3/04845 715/822 |
| 2002/0191861 A1 * | 12/2002 | Cheatle | .................... | G06K 9/38 382/282 |
| 2005/0162445 A1 * | 7/2005 | Sheasby | .................. | G06T 11/60 345/620 |
| 2013/0243320 A1 * | 9/2013 | Kopf | ....................... | G06T 5/005 382/170 |

OTHER PUBLICATIONS

Adrienne Zwart, How to Extend the Canvas of Your Photo, www.iheartfaces.com/2012/12/extending-canvas-in-photoshop, available from Internet Archive on Dec. 8, 2012.*

* cited by examiner

*Primary Examiner* — Charles Tseng
(74) *Attorney, Agent, or Firm* — Wolfe-SBMC

(57) ABSTRACT

Content aware cropping techniques are described in which a combined crop and fill operation may be performed in one-step using an automated workflow. In one or more implementations, an image is exposed for editing in a user interface and input is obtained that indicates a position for a crop frame to select a portion of the image. The crop frame may be employed as a basis for a combined crop and fill operation that is initiated by a single input or trigger that causes a sequence of actions to automatically crop the image, recognize portions of empty pixels to fill, apply a content aware fill algorithm, and produce a resulting output image. In one or more implementations, a size of the crop frame may be controlled to maintain at least one of image size, aspect ratio, or pixel resolution.

20 Claims, 11 Drawing Sheets

CONTENT AWARE CROPPING

BACKGROUND

Consumer photo editing is on the rise due at least in part to wide availability of the mobile phones, tablets, and other portable devices that include cameras and are powerful enough to support image editing software. A variety of different editing operations may be applied to process an image. One example is a cropping operation in which a sub-region of a particular image may be selected to produce a "cropped" image. For instance, cropping may be performed by users to remove unwanted objects or individuals from photos taken "on-the-go" before sharing the photos via messaging, social networks, photo sharing sites, and so forth. Some traditional photo editing applications provide largely manual cropping workflows in which a user may have to perform multiple steps to select a crop boundary, resize the canvas, and backfill content in order to produce a visually pleasant output image. Other more rudimentary cropping tools may be used to create cropped version of images that adversely alter the pixel resolution, image size, aspect ratio, and so forth. Accordingly, it may be difficult and frustrating for some users, such as un-savvy consumers, to utilize traditional cropping workflows for creating cropped photos, particularly in relation to on-the-go sharing scenarios.

SUMMARY

Content aware cropping techniques are described in which a combined crop and fill operation may be performed using an automated workflow. In one or more implementations, an image is exposed for editing in a user interface and input is obtained that indicates a position for a crop frame to select a portion of the image. The crop frame may be employed as a basis for a combined crop and fill operation that is initiated by a single input or trigger to cause a sequence of actions that automatically crop the image, recognize portions of empty pixels to fill, apply a content aware fill algorithm, and produce a resulting output image. In one or more implementations, a size of the crop frame may be controlled to maintain at least one of image size, aspect ratio, or pixel resolution.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
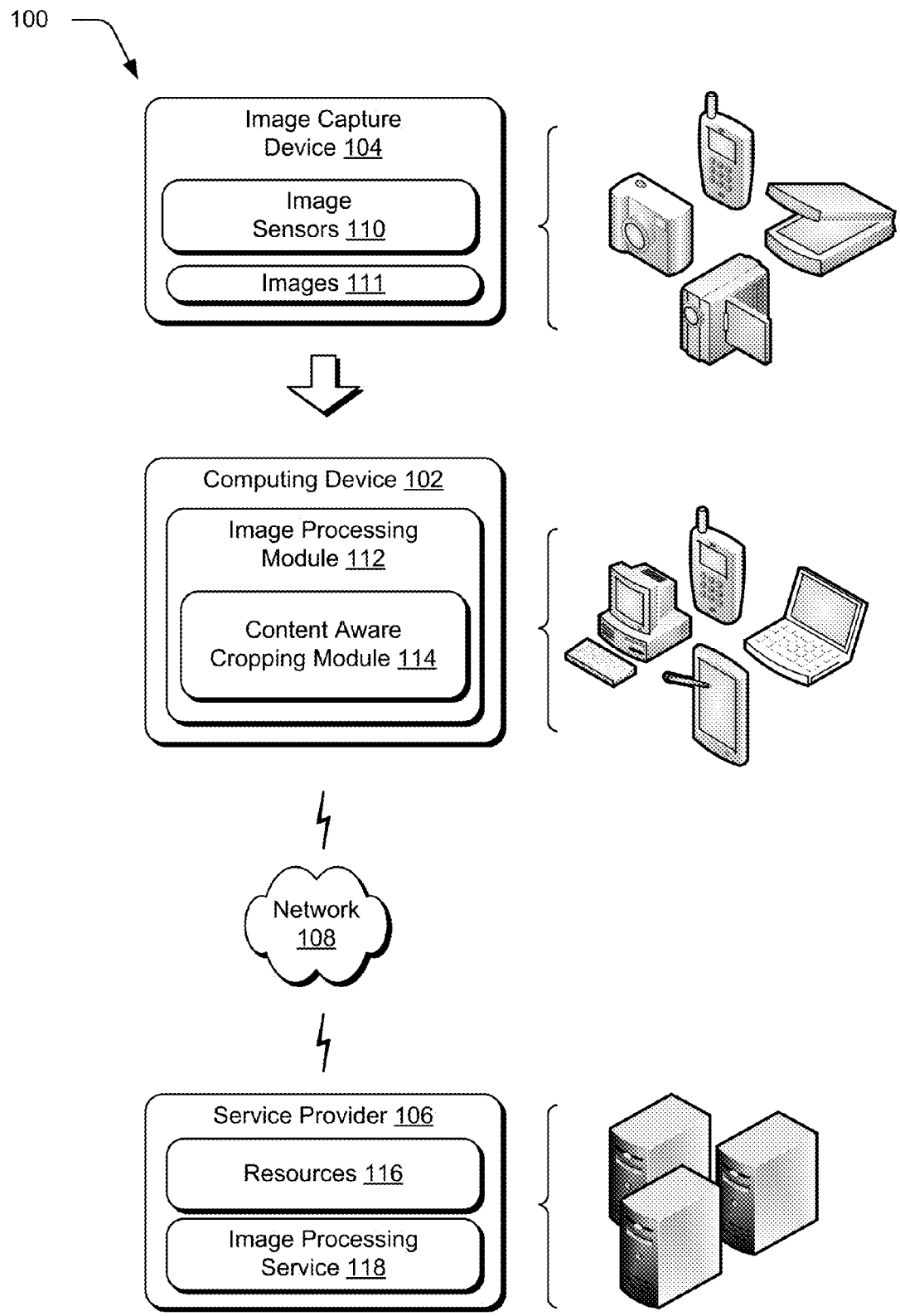
FIG. 1 is an illustration of an environment in an example implementation that is operable to employ techniques described herein.

Some traditional photo editing applications provide largely manual cropping workflows in which a user may have to perform multiple steps to select a crop boundary or frame, resize the canvas, and backfill content in order to produce a visually pleasant output image. Other rudimentary cropping tools may be used to create cropped version of images that adversely alter the pixel resolution, image size, aspect ratio, and so forth. Accordingly, it may be difficult and frustrating for some users, such as un-savvy consumers, to utilize traditional cropping workflows for creating cropped photos, particularly in relation to "on-the-go" sharing scenarios.

Content aware cropping techniques are described herein in which a combined crop and fill operation may be performed in one-step using an automated workflow. For example, a user of Photoshop® or another image editing application may select a crop tool and draw a crop frame upon an image to set the crop boundary and select a portion of the image using a mouse, touch input, or other input mechanism. The user may want to crop out a bystander from a family picture or crop a photograph of a wildlife scene to remove a telephone pole or other distracting elements. At the same time, the user may desire to maintain the overall image size rather than creating a smaller, cropped version or a scaled version with reduced quality. The automated workflow as described herein enables a one-step process to crop and fill the image in a manner that preserves image size, aspect ratio, pixel resolution, and so forth.

For example, an option to apply a combined crop and fill operation may be exposed in response to drawing of the crop frame, as a menu item, a tool bar selection, or otherwise. The option for the combined crop and fill operation may be presented individually or in combination with other available options, such as a simple crop (e.g., without fill) option and a cancel option. The option to apply a combined crop and fill may be selectable to initiate a sequence of operations to automatically crop the image, recognize portions of empty pixels to fill, apply a content aware fill algorithm, and produce a resulting output image. Accordingly, when the option for the combined crop and fill is selected, multiple operations are performed automatically to form a "cropped" and "filled" output image without further action on the part of the user.

To perform a combined crop and fill operations, the system may be configured to apply a content aware fill algorithm to fill blank portions and/or empty pixels that are formed by cropping of an image. A variety of different algorithms and techniques for content aware filling are contemplated. In general, a content aware fill algorithm relies upon pixels in areas surrounding portions being filled to determine how to fill the portions. This may involve examining content within the image in areas surrounding portions being filled, sampling pixels from the surrounding areas, and reproducing the sampled pixels in the portions being filled. Areas may be progressively filled from the boundaries of a cropped image outward to the fill boundaries. In one approach, the content aware fill is performed using a patch match algorithm designed to fill empty areas based upon random sampling of pixels/patches to detect matching patches in proximity to the empty areas.

In the following discussion, an example environment is first described that may employ the techniques described herein. Example details and procedures are then described which may be performed in the example environment as well as in other environments. Consequently, example details and procedures are not limited to the example environment and the example environment is not limited to example details and procedures described herein.

Example Environment

FIG. 1 is an illustration of an environment 100 in an example implementation that is operable to employ techniques described herein. The illustrated environment 100 includes a computing device 102 and an image capture device 104, which may be configured in a variety of ways. Additionally, the computing device 102 may be communicatively coupled to one or more service providers 106 over a network 108. Generally speaking, a service provider 106 is configured to make various resources (e.g., content, services, web applications, etc.) available over the network 108, such as the Internet, to provide a "cloud-based" computing environment and web-based functionality to clients.

The computing device 102 may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and processing resources (e.g., mobile devices). Additionally, although a single computing device 102 is shown, the computing device 102 may be representative of a plurality of different devices to perform operations. Additional details and examples regarding various configurations of computing devices, systems, and components suitable to implement aspects of the techniques described herein are discussed in relation to FIG. 10 below.

The image capture device 104 represented in FIG. 1 may also be configured in a variety of ways. Illustrated examples of such configurations include a video camera, scanner, copier, camera, mobile device (e.g., smart phone), and so forth. Although the image capture device 104 is illustrated separately from the computing device 102, the image capture device 104 may be configured as part of the computing device 102, e.g., for a tablet configuration, a laptop, a mobile phone or other implementation of a computing device having a built in image capture device 102. The image capture device 104 is illustrated as including image sensors 110 that are configured to form images 111. In general, the image capture device 102 may capture and provide images 111, via the image sensors 110, that may be stored on and further processed by the computing device 102 in various ways. Naturally, images 111 may be obtained in other ways also such as by downloading images from a website, accessing images from some form of computer readable media, and so forth.

The images 111 may be obtained by an image processing module 112. As before, although the image processing module 112 is illustrated as being implemented on a separate device it should be readily apparent that other implementations are also contemplated in which the image sensors 110 and image processing module 112 are implemented on the same device. Further, although illustrated as being provided by a computing device 102 in a desktop configuration, a variety of other configurations are also contemplated, such as remotely over a network 108 as service provided by a service provider, a web application, or other network accessible functionality.

Regardless of where implemented, the image processing module 112 is representative of functionality operable to manage images 111 in various ways. Functionality provided by the image processing module 112 to manage images may include but is not limited to functionality to organize, access, browse and view images, as well as to perform various kinds of image processing operations upon selected images. By way of example and not limitation, the image processing module 112 may include or otherwise make use of a content aware cropping module 114. The content aware cropping module 114 is representative of functionality to perform image editing operations related to cropping of images. The content aware cropping module 114 may be configured to facilitate different kinds of cropping operations. For example, the content aware cropping module 114 may be configured to enable combined crop and fill operations as discussed herein. The content aware cropping module 114 may also support simple crop operations to select a portion of an image and resize the image (e.g., "crop" the image) to boundaries set by positioning of a crop frame. Other types of cropping operations are also contemplated.

As part of combined crop and fill operations, the content aware cropping module 114 may be further configured to apply a content aware fill algorithm to fill blank portions and/or empty pixels that are formed by cropping of an image. A variety of different algorithms and techniques for content aware filling are contemplated. In general, a content aware fill algorithm relies upon pixels in areas surrounding portions being filled to determine how to fill the portions. This may involve examining content within the image in areas surrounding portions being filled, sampling pixels from the surrounding areas, and reproducing the sampled pixels in the portions being filled. In one approach, the content aware fill is performed using a patch match algorithm designed to fill empty areas based upon random sampling of pixels/patches to detect matching patches in proximity to the empty areas.

As further shown in FIG. 1, the service provider 106 may be configured to make various resources 116 available over the network 114 to clients. In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and content typically made available over a network by one or more providers. Some examples of services include, but are not limited to, a photo editing service, a web development and management service, a collaboration service, a social networking service, a messaging service, an advertisement service, and so forth. Content may include various combinations of text, video, ads, audio, multi-media streams, animations, images, web documents, web pages, applications, device applications, and the like.

For example, the service provider 106 in FIG. 1 is depicted as including an image processing service 118. The image processing service 118 represents network accessible functionality that may be made accessible to clients remotely over a network 108 to implement aspects of the techniques described herein. For example, functionality to manage and process images described herein in relation to image processing module 112 and content aware cropping module 114 may alternatively be implemented via the image processing service 118 or in combination with the image processing service 118. Thus, the image processing service 118 may be configured to provide cloud-based access operable for content aware cropping as well as other operations described above and below.

Content Aware Cropping Details

Figure 2:
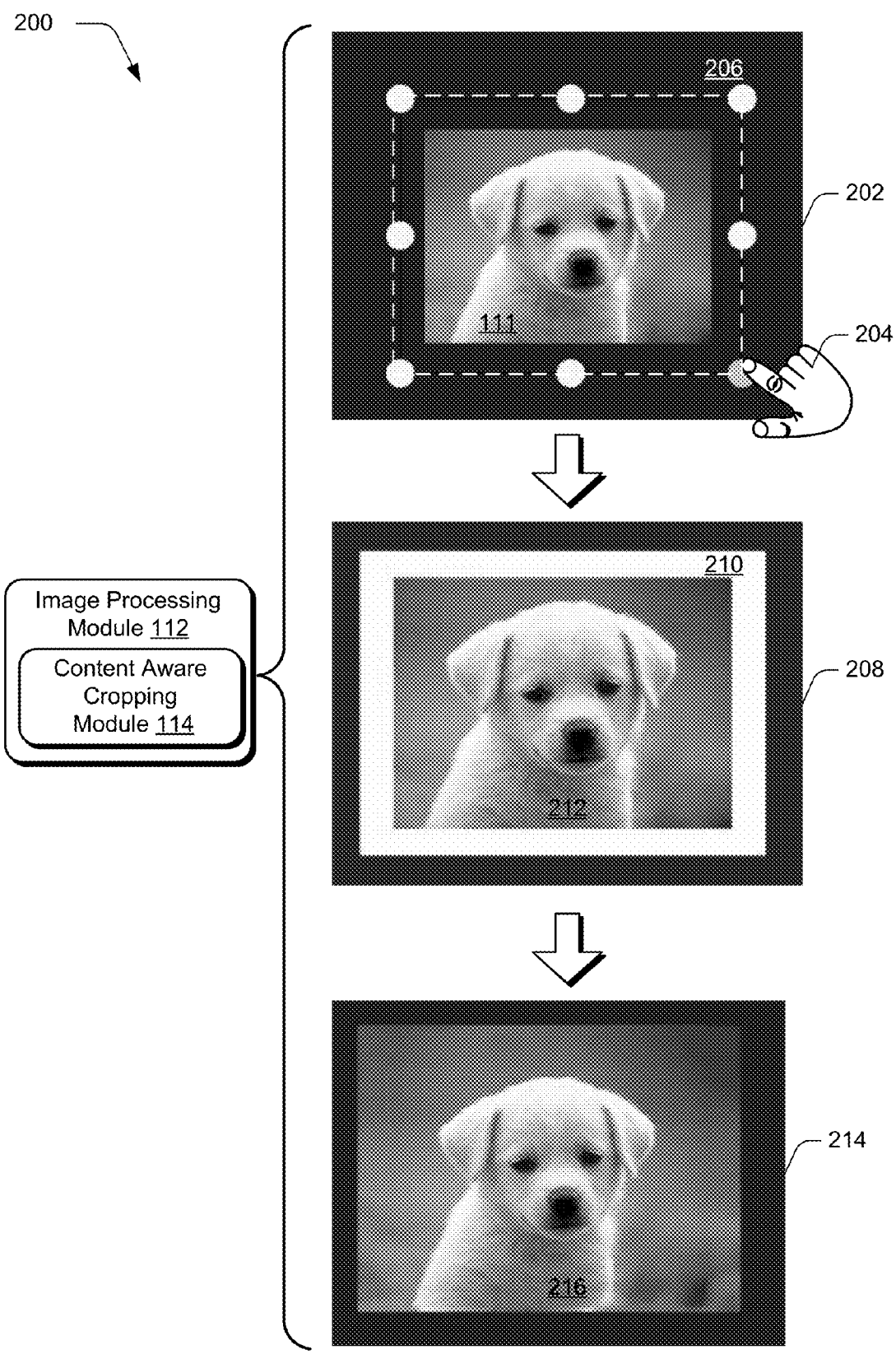
FIG. 2 depicts a system in an example implementation in which operation of an image processing module to perform image editing operations is depicted.

FIG. 2 depicts a system 200 in an example implementation in which operation of the image processing module 112 and content aware cropping module 114 of FIG. 1 is represented in connection with one or more image editing operations. The system 200 is shown using different illustrative stages of processing of an image 111 in connection with an image editing operation. The image may be obtained, directly from one or more image sensors 110, from storage upon on some form of computer-readable media, by downloading from a web site, and so on.

As shown in FIG. 2, the image 111 may be exposed for editing within a user interface associated with the image processing module 112 as represented by stage 202. The user interface may provide functionality operable to perform various image editing operations upon the image. In an implementation, the user interface may be configured to support touch interaction in addition to or in lieu of input via a mouse, keyboard or other input device. Functionality for various image editing operations may be provided using one or more different types of user interface instrumentalities such as selectable icons, menu items, lists, key combinations, tool bars, interactive dialogs, or pop-up elements, to name some examples. Thus, a user may interact to view, edit, navigate, select, and otherwise manipulate an image or a library of images using functionality accessible via the user interface.

In the context of content aware cropping techniques described herein, the user interface may be configured to support an image crop tool and/or positioning of a crop frame to set boundaries for a crop operation. For example, interaction 204 by a user as represented in stage 202 of FIG. 2 may cause positioning of a crop frame 206 within the image. The interaction 204 may occur to set both a size and location for the crop frame 206 using touch-based interaction (as shown), a mouse, or other input mechanism. In the illustrated example, the crop frame 206 is depicted as selecting a photograph of a dog, and in particular the frame extends outside the boundaries of the dog photograph on all four sides. Alternatively, a frame may be positioned entirely within the photograph or extend across some but not all of the boundaries. In each of these cases, portions having empty pixels may be defined and/or formed based upon the positioning of the crop frame 206 with respect to the original image. Such portions are referred to herein as fill portions as these are areas which are to be filled by application of a content aware fill.

For example, stage 208 in FIG. 2 depicts fill portions 210 that are formed by positioning of the crop frame 206. The cropped portion 212 of the image corresponds to the image data and pixel data that is contained within the crop frame 206. In this case, the cropped portion 212 corresponds to the entire original image 111 since the frame extends beyond the image boundaries on each side. Content aware cropping module 114 is configured to ascertain appropriate fill portions based on the positioning of the crop frame and perform processing to determine how to fill these portions with content. Accordingly, the content aware cropping module 114 may automatically recognize that the crop frame 206 extends beyond the picture boundaries and interpret this as an indication that the user wants to move the boundaries outward in accordance with the extension(s) beyond the original boundaries. This movement outward creates the fill portions 210 as blank areas that do not include corresponding image data or pixel data.

Generally, fill portions 210 may be formed in relation to one or more boundaries over which a crop frame extends. Additionally, if the crop frame is entirely within the image boundaries, the content aware cropping module 114 may be configured to utilize boundaries of the original image as boundaries of the output, "cropped" image. In this example, the original size of the image is maintained, unwanted elements (e.g., outside of the crop frame) may be cropped out, and fill portions are established in areas between the crop frame and the boundaries of the original image. Additional details and examples regarding formation of fill portions based on positioning of a crop frame are provided below in relation to FIG. 7A.

Once fill portions are established based on the position of the crop frame, content aware cropping module 114 may operate to perform processing to fill empty pixels of the fill portions with content. As mentioned, this may involve applying a content aware fill algorithm that relies upon content of pixels in areas surrounding the portions being filled to determine how to fill the empty pixels. As shown at stage 214 for example, an output image 216 may be produced by combining image data/pixel data for the cropped portion 212 with image data/pixel data for the fill portions 210 derived by applying content aware fill algorithm. For instance, the output image 216 shown in FIG. 2 illustrates that background content surrounding the dog in the cropped portion 212 has been expanded into the fill portions 210. In this case, a larger image that corresponds to the crop frame 206 is created.

In operation, a combined crop and fill operation may be initiated in various ways. In one approach, a dedicated crop and fill tool may be provided. In this case, the combined crop and fill operation may be performed automatically responsive to selection of the tool and positioning of the crop frame. This may occur with or without first prompting a user to confirm the crop, such as by providing a control operable to select "Ok" or "Cancel." In another approach, a crop tool may be configured to support multiple different types of crop operations. In this case, selection of the tool and positioning of a crop frame may expose an option to select between the different types of available crop operations including a combined crop and fill operation as described herein. Optionally, preview images (e.g., thumbnails) may also be presented to provide visual indications to a user regarding how outputs formed with different ones of the available crop operations will appear. A selected crop operation may then be performed based upon a selection made from the available options.

Accordingly, a user selection to perform a combined crop and fill upon an image exposed for editing via an image processing module may be obtained in various ways. Once a combined crop and fill is initiated, a sequence of multiple operations for the crop and fill may occur to create the output image without further user input. In other words, the combined crop and fill occurs responsive to a single input action or trigger in contrast to traditional techniques which involved many separate manual steps. As represented by the example shown in FIG. 2, the sequence of operations that are performed responsive to initiation of a combined crop and fill include, but are not limited to, cropping the image in accordance with a crop frame positioned within the image, recognizing fill portions having empty pixels formed by positioning of the crop frame, applying a content aware fill algorithm to fill the empty pixels in the fill portions based on an examination of content in areas surrounding the fill portions, and producing an output image that combines the image as cropped and the fill portion as filled. Details regarding these and other aspects of content aware cropping techniques are discussed in relation to the following figures.

Figure 3:
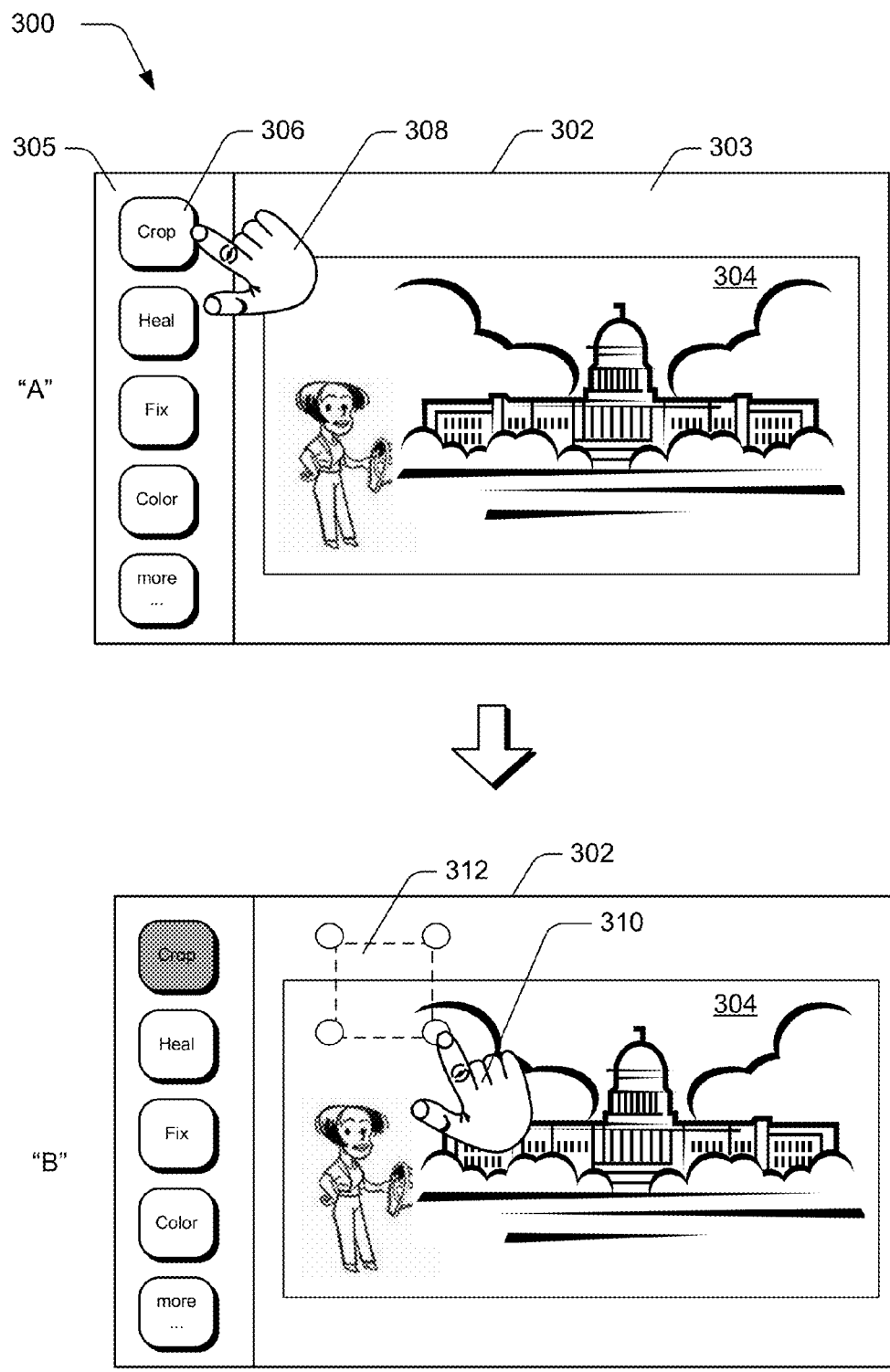
FIG. 3 depicts details of a user interface for content aware cropping in accordance with one or more implementations.

FIG. 3 depicts generally at 300 an example implementation of a user interface 302 that may implement content aware cropping techniques discussed above and below. The example user interface may be exposed via an image processing module 112 as previously mentioned. The user interface 302 may include an image display area 303 in which an image 304 is presented. The presented image 304 may be viewed and manipulated in various ways by a user using functionality provided by the image processing module 112. Various functionality may be accessible via a tools menu 305, which in this example is as a tool bar having selectable icons corresponding to various tools and image editing operations. Other configuration of a tools menu 305 are also contemplated such as a menu bar, a pop-up tool box, or other suitable configuration that facilitate selection from among various functionality provided by the image processing module 112. As represented in FIG. 3, the tools menu 305 may implement at least a crop tool 306 operable to perform various crop operations upon the image 304 as discussed herein.

FIG. 3 additionally represents an example scenario in which the crop tool 306 may be used to initiate crop operations by way of different views "A" and "B" of the user interface 302. In view "A', interaction 308 to select the crop tool 306 from the tools menu is depicted. This action activates the crop tool 306 such that further interaction 310 may occur to create and position a crop frame 312 as shown in view "B." In a touch based input scenario, the selection of the tool and crop frame manipulation may occur via touch. Naturally, a stylus, mouse, keyboard or other input mechanism may also be employed.

Figure 4:
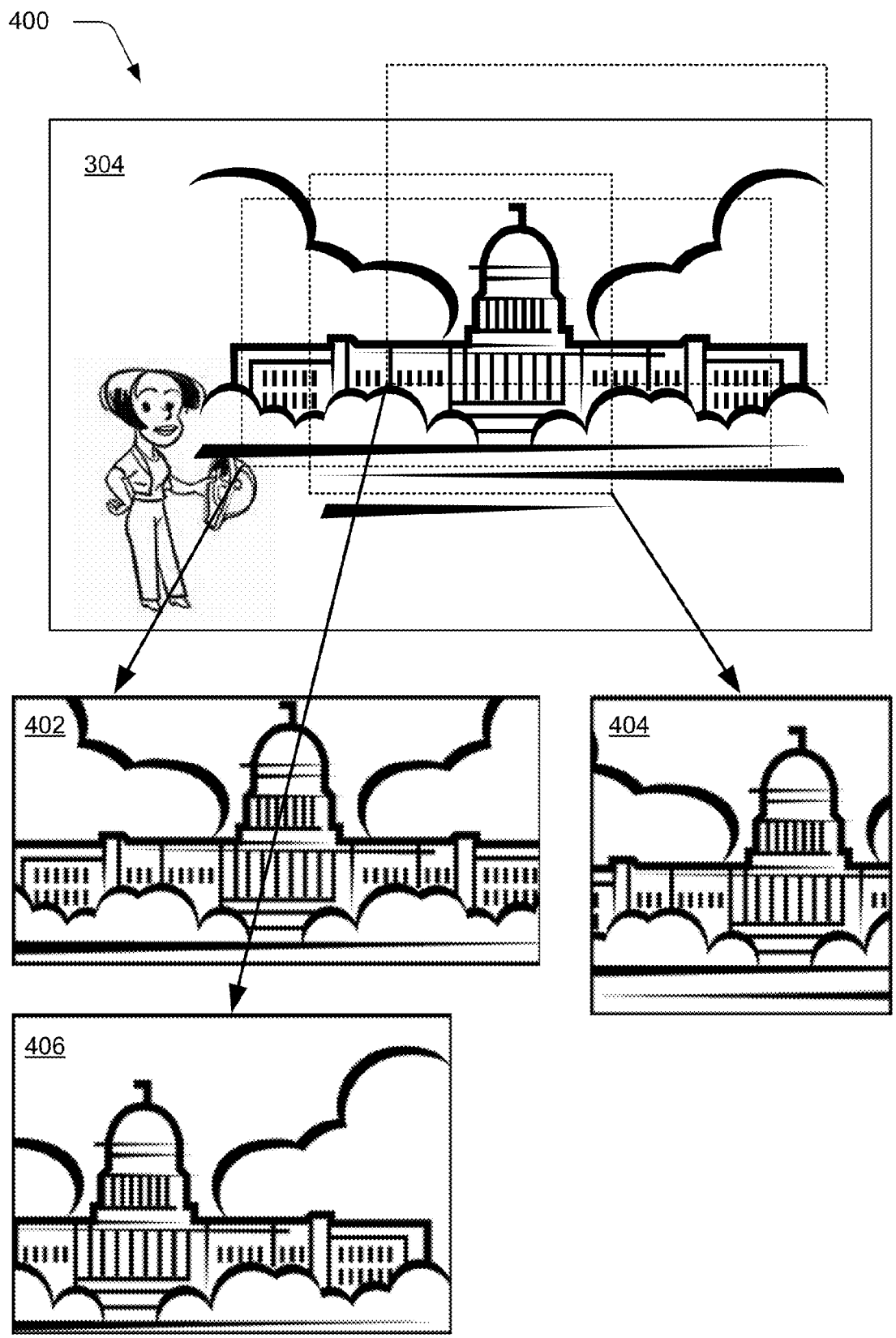
FIG. 4 depicts example croppings in accordance with one or more implementations.

Referring to FIG. 4, a representation is depicted generally at 400 of different image croppings that may be selected and formed from the example image 304 of FIG. 3 by manipulation of a crop tool and crop frame in the manner described herein. Generally, different positioning of the crop frame results in different cropped images, such as the example cropped images 402, 404, and 406 illustrated in FIG. 4. Notably, the crop frame may be positioned within the image 304 or in a manner that causes the frame to extend beyond one or more boundaries of the image. The crop frame may also be positioned to contain an entire image, such as in the example of FIG. 2. Techniques for content aware cropping as discussed herein may be applied in each of these cases.

Figure 5:
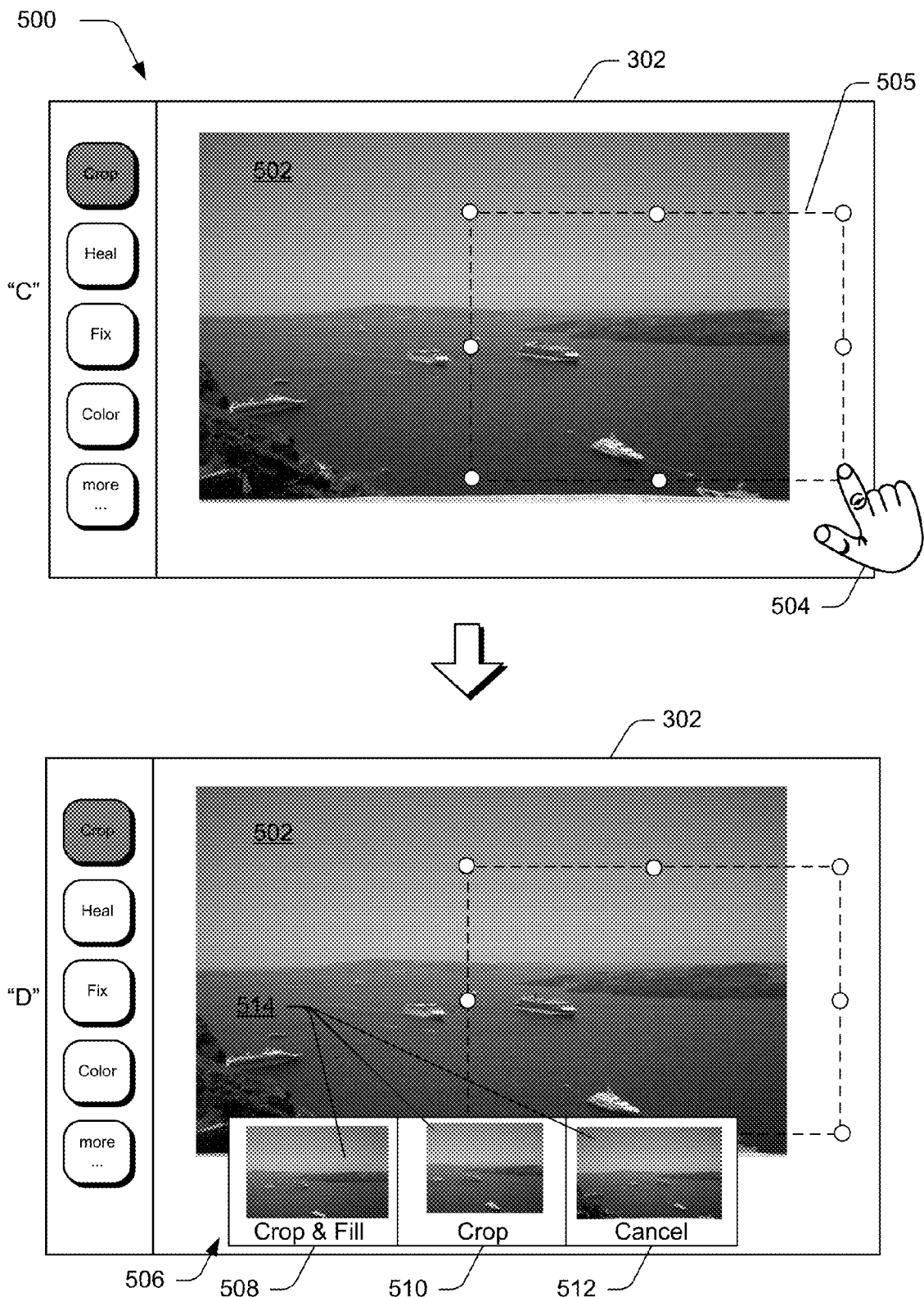
FIG. 5 depicts a representation of an example interaction scenario in accordance with one or more implementations.

FIG. 5 depicts generally at 500 another example scenario in which an automated workflow may be implemented to facilitate crop operations including a combined crop and fill operation. The scenario is discussed in relation to different views "C" and "D" of the example user interface 302. In particular, the user interface 302 is shown in view "C" as presenting an image 502 of an ocean view with a number of ships. In this example, the image 502 includes some land features and boats in the foreground and to the left-hand side that a user may want to remove. The user may also want to focus the image more tightly upon the central portion of the image. The automated workflow may be configured to provide multiple crop options based on placement of a crop frame in the image 502. Preview images of the available options may also be provided as discussed below.

As represented in view "C" of FIG. 5, a crop tool may be activated and interaction 504 may occur to draw and position a crop frame 505 on the image 502. In this example, the crop frame 505 extends outside the right-hand boundary of the image although other configurations of a crop frame may also be formed as noted above and below. Based on the positioning of the crop frame 505, the content aware cropping module 114 may operate to recognize empty pixels formed by the frame and suggest one or more cropping solutions.

In one or more implementations, the suggested solutions include both a combined crop and fill option in which cropping and a content aware fill are performed together in one sequence and a simple crop option in which the image is cropped to content within the crop frame without filling. A cancel option may also be provided to revert back to the original view of the image 502. For example, as represented in view "D" of FIG. 5, a user interface element 506 configured to enable selection from among multiple available crop operations may be exposed responsive to positioning the crop frame or otherwise initiating crop operations. The user interface element 506 may be configured in various ways to present the available options such as being configured as a dialog box, a menu, a list box, a preview pane (as shown), a slide-out or pop-up window, and so forth. The example user interface element 506 of FIG. 5 is depicted as a preview pane that includes a combined crop and fill option 508, a simple crop option 510, and a cancel option 512. The user interface element 506 may additionally be configured to include preview images 514 (e.g., thumbnails) that may be generated for each of the available options responsive to positioning of the crop frame 505.

Accordingly, the preview pane as in the example of FIG. 5 enables a user to get a preview of results of available crop operations prior to applying the operations to modify the original image. As a user manipulates the crop pane 505 within the user interface to different positions, the preview images 514 may be configured to update accordingly in substantially "real-time" to show corresponding changes to the outputs. The user may then select one of the options (by touch or otherwise) to confirm the operation and apply the changes based on the selected crop operation. In an implementation, the preview images may be configured as selectable controls that are selectable to cause the initiation of corresponding crop operations. Thus, the preview of the crop and fill option may be selectable to apply a corresponding crop and content aware fill.

Figure 6:
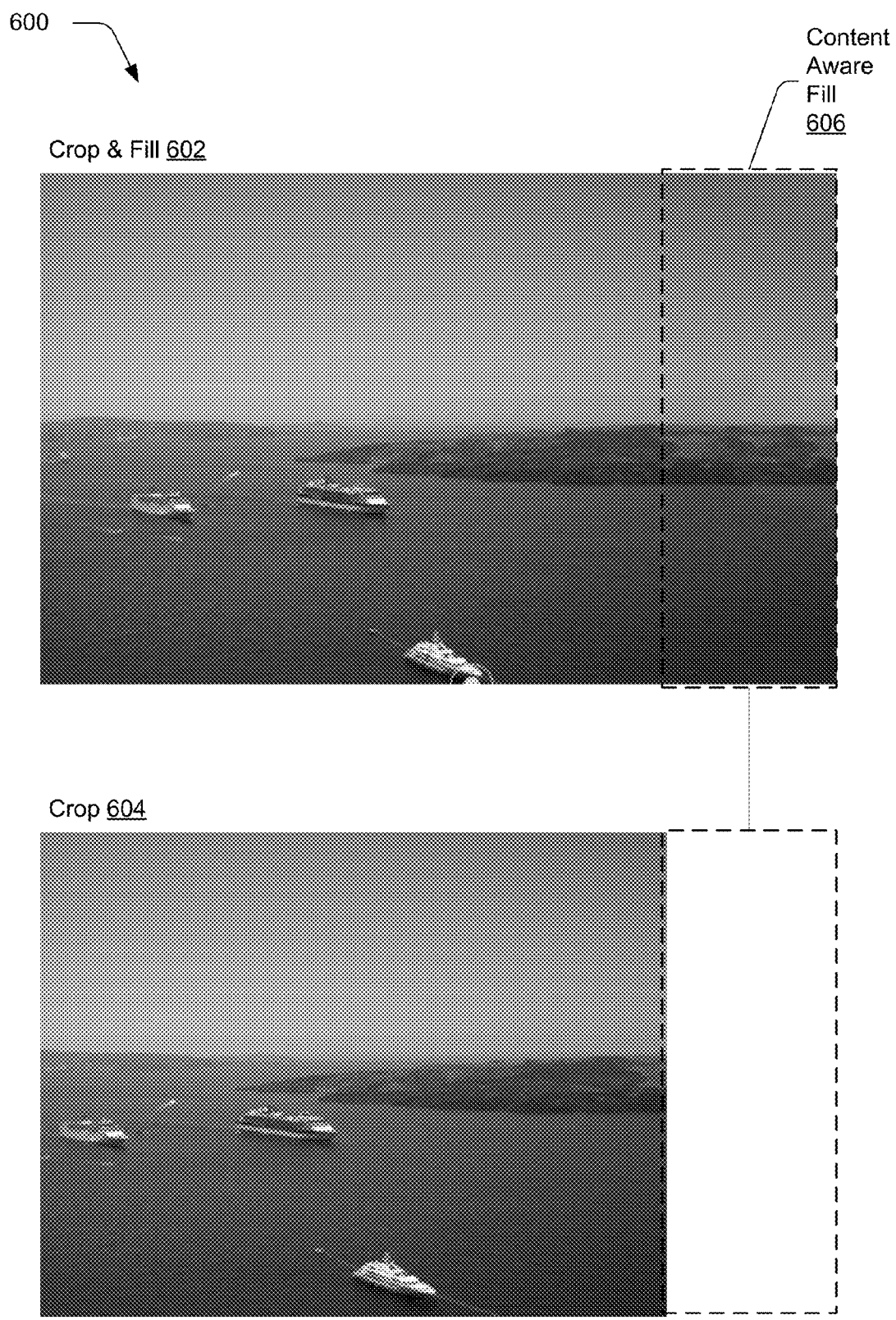
FIG. 6 depicts a comparison of example processed images that may result in response to the example interaction of FIG. 5.

A comparison of output images corresponding to selection of the crop and fill option 508 and selection of the simple crop option 510 in the example scenario of FIG. 5 is illustrated in FIG. 6 generally at 600. In particular, a crop and fill 602 version of the image that represents results of a combined crop and fill (e.g., content aware fill) is shown above a crop 604 version of the image that reflects a simple crop (e.g., without fill). Note that the crop 604 version sacrifices overall image size and aspect ratio by keeping the empty space that is formed by the crop frame. In comparison, content aware fill 606 is added to the crop and fill 602 version, which creates a larger image and may also enable users to generate croppings of an image that maintain one or more of image size, aspect ratio, or pixel resolution.

Figure 7A:
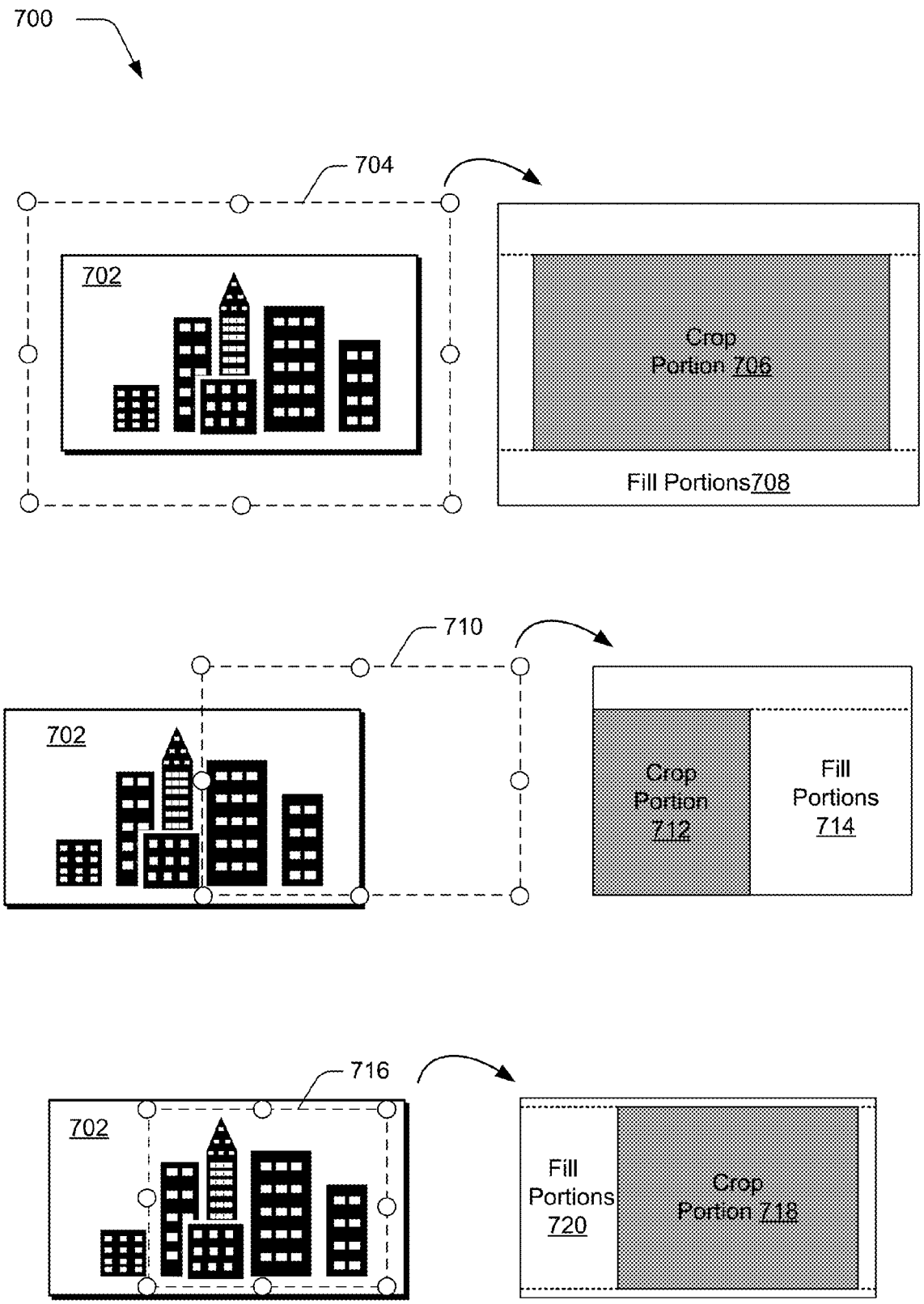
FIG. 7A depicts examples and details regarding formation of fill portions by different positions of a crop frame in accordance with one or more implementations.

FIG. 7A illustrates generally at 700 some details and examples regarding formation of fill portions based on positioning of a crop frame. Crop frames may be drawn and positioned via a user interface of an image processing application as previously described. The examples of FIG. 7A depict relationships between crop frame position with respect to an image 702 and corresponding fill portions that are formed thereby and may subsequently be recognized by the system. For example, crop frame 704 is shown as being positioned to contain the image 702. In this case, a crop portion 706 corresponding to the original image size and boundaries is formed and fill portions 708 are formed in the areas between the image boundaries and the frame boundaries. In one approach, the content aware cropping module 114 is configured to recognize fill portions 708 as portions of the frame that are out-of-bounds. In the case of a rectangular frame and image as shown, the fill portions 708 may comprise rectangles for each of the boundaries that extends beyond the image (e.g., four rectangular portions surrounding the crop portion in this example denoted by dashed lines). Naturally, if the crop frame is rotated or a lasso type crop tool is used to make an irregularly shaped frame, other shapes for fill portions may be formed.

Crop frame 710 is shown as being positioned to extend beyond the top and right-hand boundaries of the image 702. In this case, a crop portion 712 corresponding to image data and pixel data of the image contained within the crop frame boundaries is formed and fill portions 714 are formed in the areas of the frame outside of the image boundaries. Here, two rectangular fill portions may be formed and recognized.

Crop frame 716 is shown as being positioned entirely within the boundaries of the image 702. As noted previously, this positioning may be interpreted as an indication to use the boundaries of the image 702 as the boundaries for the output image. In this case, a crop portion 718 corresponding to crop frame boundaries is formed and fill portions 720 are formed in the areas between the crop frame and the image boundaries. Here, four rectangular fill portions may once again be formed and recognized.

Figure 7B:
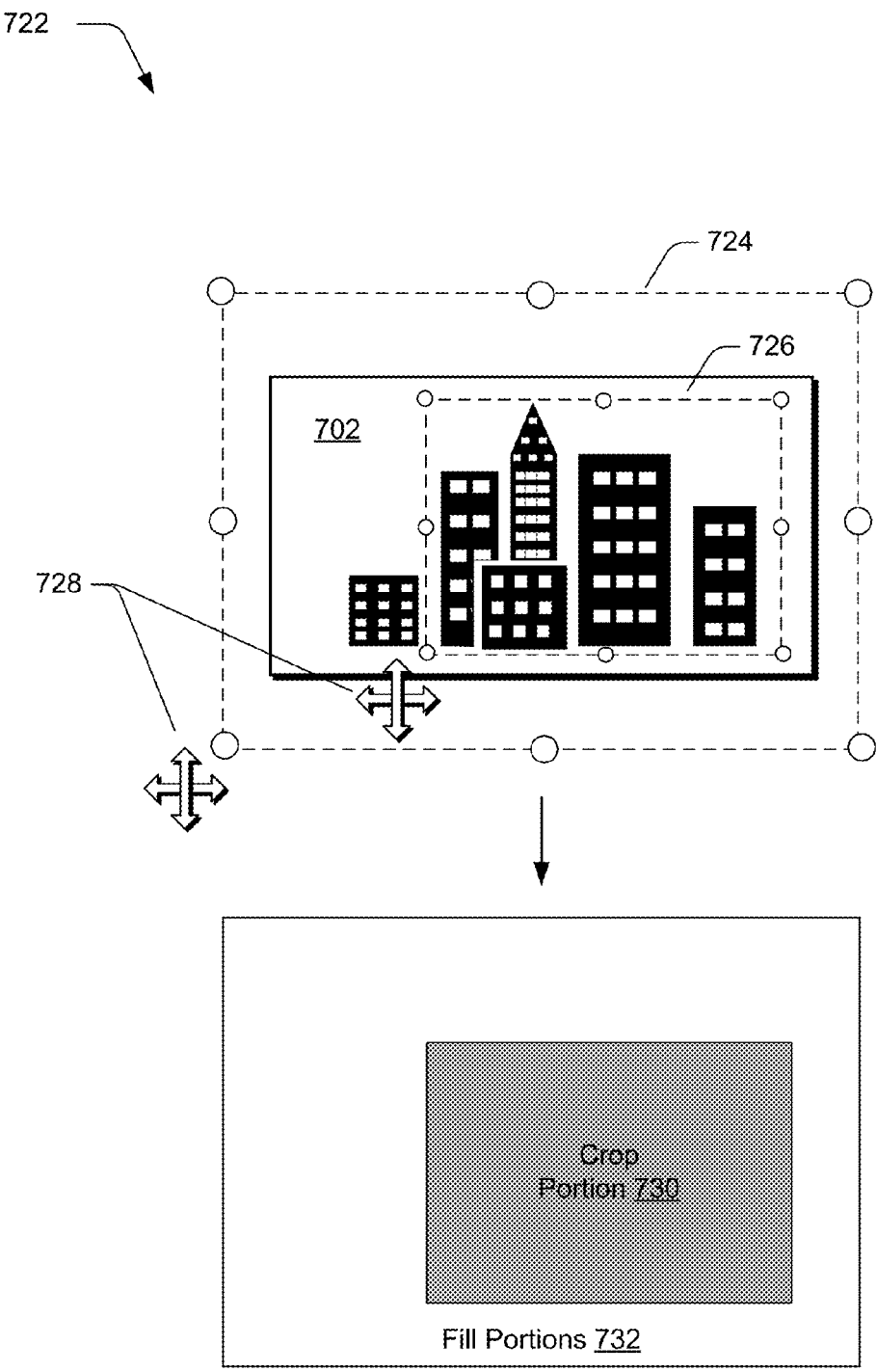
FIG. 7B depicts an example in which a crop frame and fill frame are provided that are independently controllable in accordance with one or more implementations.

FIG. 7B depicts generally at 722 an example in which a crop frame and fill frame are provided that are independently controllable in accordance with one or more implementations. For example, a fill frame 724 is shown that may be employed in conjunction with a crop frame 726 to provide a user with greater control over an output image. As represented in FIG. 7B by direction arrows 728, the crop frame and fill frame are operable independently of each other to manipulate the dimensions and positions of the frames separately. Here, a crop portion 730 corresponding to crop frame boundaries is formed and fill portions 732 are formed in the areas between the crop frame and the fill frame 724 boundaries, which as shown may extend beyond the image boundaries. The approach illustrated in FIG. 7B may be employed in a scenario in which a user wants to crop out a portion of the image (such as unwanted objects or people) and may additionally want to extend the image boundaries rather than keeping the original size. The fill frame 724 may be made accessible via a user interface in various ways. For example, representations for a fill frame may appear automatically at the borders of the image upon positioning of the crop frame 726 within the image boundaries. In another example, a user selection may be employed to expose the fill frame 724, such as selection of a menu item or tool bar icon or interaction with the image boundaries such as clicking/tapping one of the images boundaries or a dragging gesture to drag the boundaries outward. A user may then provide input to set the fill frame 724 to a desired position and size and separately position and size the crop frame 726.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the example of FIGS. 1-7.

Figure 8:
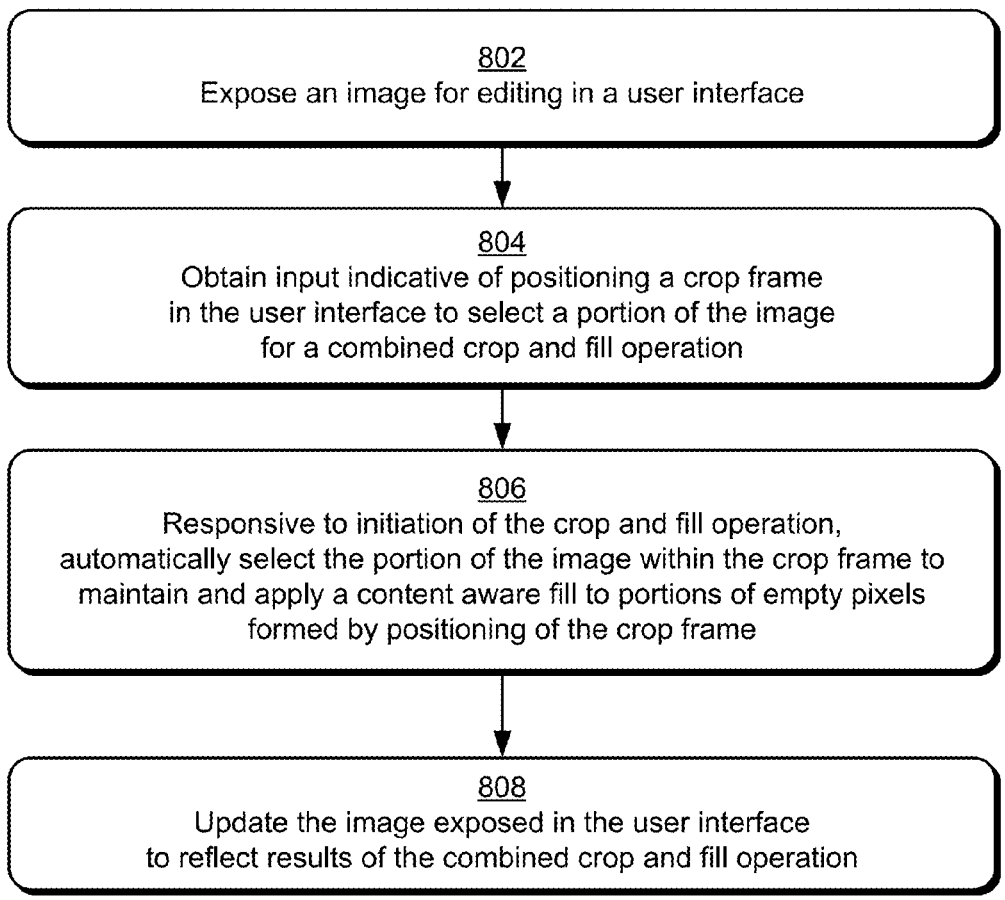
FIG. 8 is a flow diagram depicting a procedure in an example implementation in which content aware cropping is performed.

FIG. 8 depicts a procedure 800 in an example implementation in which a combined crop and fill operation is performed. An image is exposed for editing in a user interface (block 802). For example, an image processing module 112 may be invoked to view and process images as discussed herein. The image processing module 112 may support cropping via a content aware cropping module 114 as well as other functionality for managing and performing image editing operations upon images. A selected image may be exposed for editing via a user interface provided by or otherwise associated with the image processing module 112.

Input is obtained that indicative of positioning a crop frame in the user interface to select a portion of the image for a combined crop and fill operation (block 804). The drawing and positioning of a crop frame may occur in various ways including touch-based interaction or a selection using an input device (e.g., mouse, keyboard, etc.). The input may be obtained in connection with a dedicated crop and fill tool. In addition or alternatively, the input may be obtained via a crop tool that provides multiple crop options such as the example discussed in relation to FIG. 5. In either case, preview images as described herein may be used to enable a user to preview and confirm a crop operation prior to applying the operations.

Responsive to initiation of the crop and fill operation, the portion of the image within the crop frame to maintain is automatically selected and a content aware fill is applied to portions of empty pixels formed by positioning of the crop frame (block 806). Then, the image exposed in the user interface is updated to reflect results of the combined crop and fill operation (block 808). For example, the content aware cropping module 114 may be further configured to apply a content aware fill algorithm to fill blank portions and/or empty pixels that are formed by cropping of an image. As previously noted, a variety of different algorithms and techniques for content aware filling are contemplated. The content aware fill algorithm relies upon pixels in areas surrounding portions being filled to determine how to fill the portions. This involves examining content within the image in areas surrounding portions being filled, sampling pixels from the surrounding areas, and reproducing the sampled pixels in the portions being filled. In one approach, the content aware fill is performed using a patch match algorithm designed to fill empty areas based upon random sampling of pixels/patches to detect matching patches in proximity to the empty areas.

A combined crop and fill operation may be initiated in various ways. For example, positioning of the crop frame may automatically trigger a sequence of operations to produce an output image that reflects results of a crop and fill operation. In this case, initiation of the combined crop and fill operation occurs automatically responsive to the positioning of the crop frame. This approach may be implemented using a dedicated crop and fill tool and associated crop and fill mode provided by an image processing module 112.

In addition or alternatively, a crop and fill option may be selected from multiple available options, such as via a user interface element 506 as in FIG. 5 that is exposed responsive to positioning a crop frame. In any case, initiation triggers a sequence that does not rely upon further user input to generate an output image. The output image is formed by processing to both crop the image by selecting the portion of the original image within the crop frame to keep and apply a content aware fill to portions of empty pixels formed by positioning of crop frame (examples of which were discussed in relation to FIG. 7A and elsewhere herein). The content aware fill relies upon content of the image in the cropped portions to select content for the empty pixels. Effectively, the content contained in the cropped portion is extended into the empty areas by creating patches based on content in close proximity to the empty areas. Accordingly, an output image (e.g., the "updated" image) may be rendered in the user interface by combining pixels for the portion of the image within the crop frame with pixels produced by the content aware fill for the portions of empty pixels.

Figure 9:
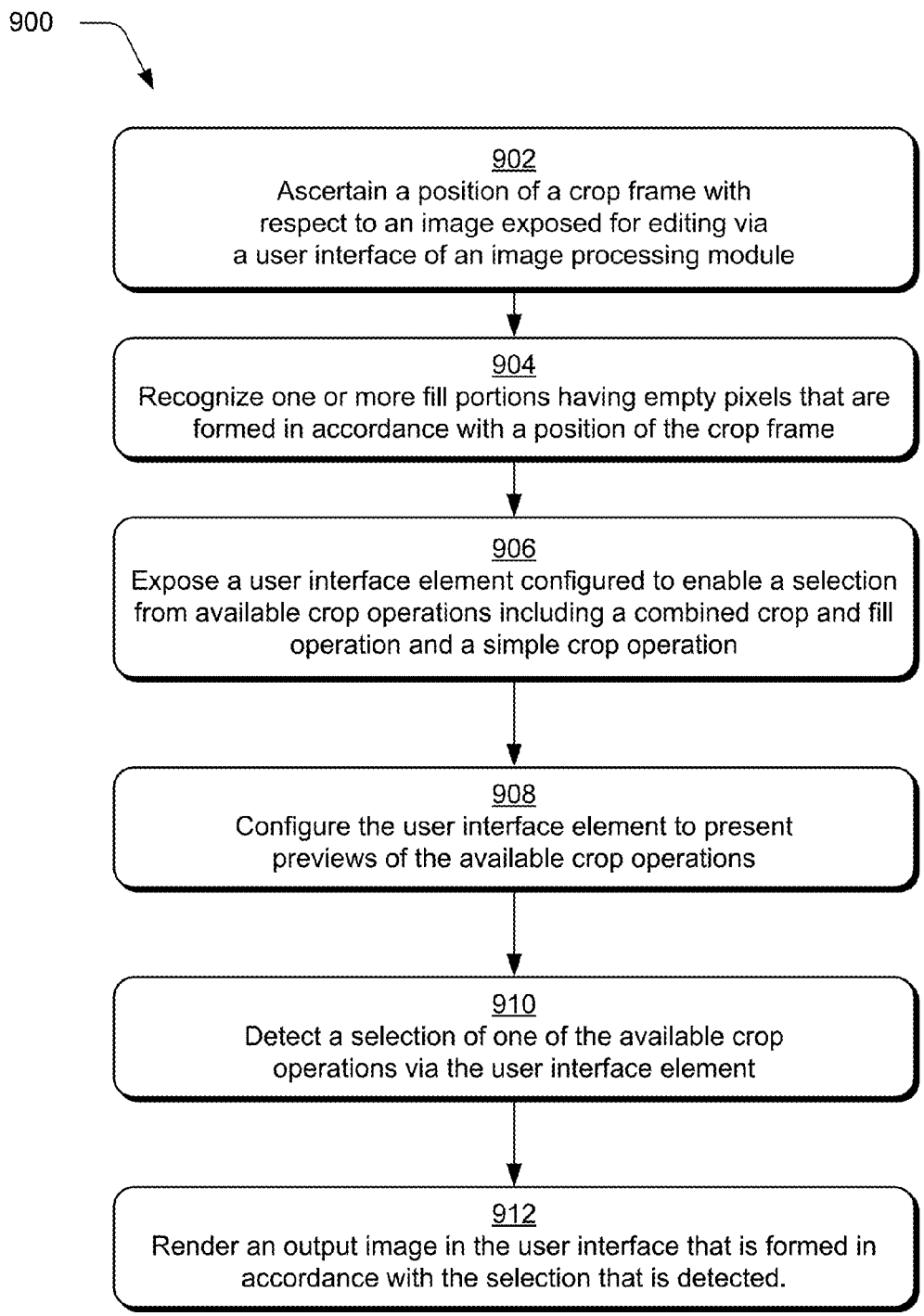
FIG. 9 is a flow diagram depicting a procedure in an example implementation in which previews of cropped images are employed to facilitate selection from among multiple available crop options.

FIG. 9 depicts is a flow diagram depicting a procedure 900 in an example implementation in which preview images are employed to facilitate a selection from among multiple available crop operations. A position of a crop frame is ascertained with respect to an image exposed for editing via a user interface of an image processing module (block 902). For example, a user may provide input to position a crop frame in an image as previously noted. This may occur by dragging a finger across a touch screen to set the dimensions and position of the crop frame or other comparable input. In an implementation, the dimensions of the crop frame may be controlled or "locked" to maintain one or both of a size of the original image or an aspect ratio of the image. In addition or alternatively, the crop frame and subsequent cropping may be controlled to preserve pixel data for the portion of the image within the crop frame and overall pixel resolution of the image exposed for editing. Thus, positioning of the crop frame may involve selections that are constrained by defined parameters for the frame size, aspect ratio, resolution, and so forth. In addition, a fill frame that is operable independently may be exposed in some scenarios as discussed in relation to FIG. 7B above.

In another approach, one or more suggested, alternative crop frames (or fill frames) may be presented responsive to ascertaining the position of the crop frame set by the user. This may involve outputting representations of one or more alternative frames that are based at least in part upon the user input frame. For example, different suggested frames may be configured to preserve different image attributes such as the original image size, the aspect ratio, or overall resolution. The one or more representations of alternative crop frames may be presented alongside a user input frame and an option to select from among the multiple frames may be provided. Processing to establish an output image(s) may then be performed based upon a selected one(s) of the multiple frames. In addition or alternatively, preview images corresponding to each of various frame options (suggested and user generated) may be presented to enable users to preview each option and make a selection from among the options.

After one or more crop frames are selected in the manner described, one or more corresponding fill portions are recognized that have empty pixels formed in accordance with a position of the crop frame (block 904). Fill portions such as those discussed in relation to the examples of FIG. 7A may be formed and recognized. Fill portions may be recognized for one or more crop frame options. Recognition of the fill portions enable the content aware cropping module 114 to process the image to identify and fill empty pixels. This processing may occur to generate preview images for each of multiple available crop operations as well as for multiple different crop frame options. Thus, various potential options for cropping an image may be exposed to the user in a preview format.

To do so, a user interface element is exposed that is configured to enable a selection from available crop operations including a combined crop and fill operation and a simple crop operation (block 906) and the user interface element is configured to present previews of the available crop operations (block 908). For example, a preview pane having thumbnails for multiple options may be exposed to facilitate user selection of a crop option, such as the example discussed in relation to FIG. 5. Other kinds of user interface elements and preview techniques are also contemplated. For example, previews may be exposed by hovering a cursor proximate to individual crop frame representations or proximate to a preview indicator or icon rendered in connection with the crop frames. Other implementations may involve slide-out windows or dedicated side bar portions of the user interface that are configured to show previews of croppings and other image processing operations.

Then, a selection of one of the available crop operations via the user interface element is detected (block 910) and an output image is rendered in the user interface that is formed in accordance with the selection that is detected (912). For instance, considering again the example of FIG. 5, a combined crop and fill operation may be performed responsive to selection of the crop and fill option 508. This may produce a crop and fill 602 version of the image as represented in FIG. 6. On the other hand, a simple crop may be performed if the simple crop option 510 is selected, which produces a crop 604 version of the image as also represented in FIG. 6. Alternatively, the cancel option 512 may be selected to cancel the crop altogether and revert back to the original image. Thus, the output image that is generated is configured to reflect processing in accordance with one of the available crop operations that is selected.

Example System and Device

Figure 10:
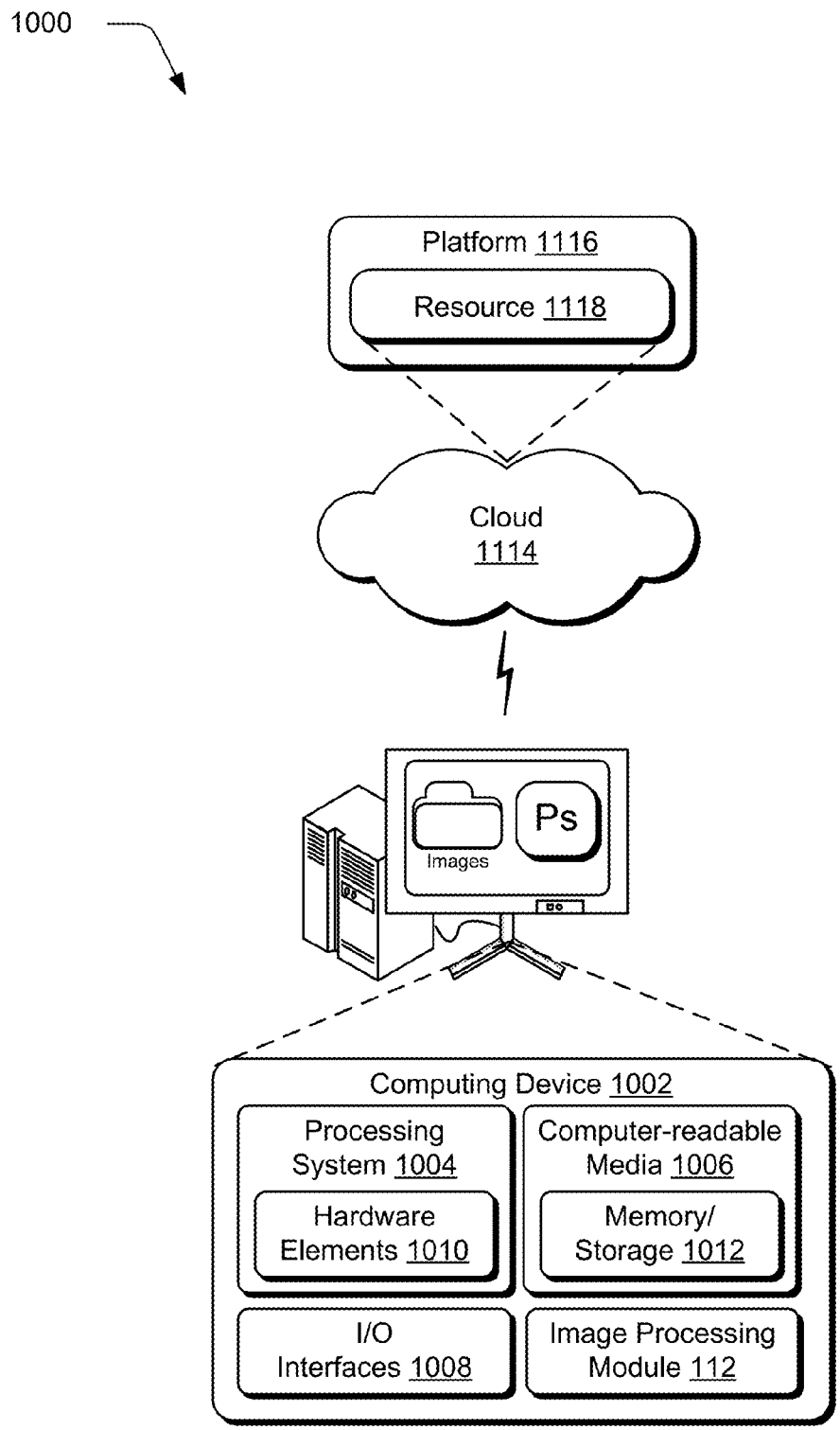
FIG. 10 illustrates an example system including various components of an example device that can be implemented as any type of computing device as described or utilized with reference to FIGS. 1 to 9 to implement aspects of the techniques described herein.

FIG. 10 illustrates an example system generally at 1000 that includes an example computing device 1002 that is representative of one or more computing systems and devices that may implement the various techniques described herein. This is illustrated through inclusion of the image processing module 112, which may be configured to process image data, such as image data captured by an image capture device 104. The computing device 1002 may be, for example, a server of a service provider, a device associated with a client (e.g., a client device), an on-chip system, or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" refers to media and devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media including by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and functions may be executable/operable by one or more articles of manufacture (for example, one or more computing devices 1002 and processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes or is representative of a platform 1016 for resources 1018. The platform 1016 abstracts underlying functionality of hardware (e.g., servers) and software resources of the cloud 1014. The resources 1018 may include applications or data that can be utilized while computer processing is executed on servers that are remote from the computing device 1002. Resources 1018 can also include services provided over the Internet or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. One or more non-transitory computer-readable storage media storing instructions that, responsive to execution by a computing device, are configured to cause the computing device to perform operations for image processing comprising:
    ascertaining a position of a crop frame with respect to an image exposed for editing via a user interface of an image processing module;
    recognizing one or more fill portions having empty pixels that are formed in accordance with the position of the crop frame;
    exposing a user interface element to enable a selection from available crop operations including a combined crop and fill operation and a simple crop operation, the user interface element not being exposed until after ascertaining the position of the crop frame;
    configuring the user interface element to simultaneously present preview images of the available crop operations;
    detecting a selection of one of the available crop operations by selecting one of the corresponding preview images presented in the user interface element to cause the initiation of the selected crop operation; and
    rendering an output image in the user interface that is formed in accordance with the selection of the one of the available crop operations that is detected.

2. One or more non-transitory computer-readable storage media as described in claim 1, wherein the instructions are further configured to cause the computing device to perform operations comprising:
    responsive to detecting the selection as a selection of the combined crop and fill operation, automatically performing a sequence of multiple operations for the crop and fill without further user input.

3. One or more non-transitory computer-readable storage media as described in claim 1, wherein the instructions are further configured to cause the computing device to perform operations comprising:
    responsive to ascertaining the position of the crop frame, outputting a representation of an alternative crop frame that is configured to preserve an original image size corresponding to the image exposed for editing.

4. One or more non-transitory computer-readable storage media as described in claim 1, wherein the recognizing the one or more fill portions having empty pixels includes applying a content aware fill to the one or more fill portions having empty pixels formed by the position of the crop frame.

5. One or more non-transitory computer-readable storage media as described in claim 1, wherein the user interface corresponds to an image editing application configured to provide multiple tools for editing images.

6. A method implemented by a computing device comprising:
    under control of one or more processors configured with executable instructions:
    ascertaining a position of a crop frame with respect to an image exposed for editing via a user interface of an image processing module;
    recognizing one or more fill portions having empty pixels that are formed in accordance with the position of the crop frame;
    exposing a user interface element to enable a selection from available crop operations including a combined crop and fill operation and a simple crop operation, the user interface element not being exposed until after ascertaining the position of the crop frame;

configuring the user interface element to simultaneously present preview images of the available crop operations;

detecting a selection of one of the available crop operations by selecting one of the corresponding preview images presented in the user interface element to cause the initiation of the selected crop operation; and rendering an output image in the user interface that is formed in accordance with the selection of the one of the available crop operations that is detected.

7. A method as described in claim 6, further comprising responsive to detecting the selection as a selection of the combined crop and fill operation, automatically performing a sequence of multiple operations for the crop and fill without further user input.

8. A method as described in claim 6, further comprising responsive to ascertaining the position of the crop frame, outputting a representation of an alternative crop frame that is configured to preserve an original image size corresponding to the image exposed for editing.

9. A method as described in claim 6, further comprising responsive to initiation of the combined crop and fill operation, automatically selecting the portion of the image within the crop frame to maintain; and applying a content aware fill to the one or more fill portions having empty pixels formed by the position of the crop frame.

10. A method as described in claim 6, wherein the rendering the output image in the user interface includes updating the image exposed in the user interface to reflect results of a crop and fill operation responsive to selection of the corresponding preview image.

11. A method as described in claim 6, wherein the rendering the output image in the user interface includes combining pixels for the portion of the image within the crop frame with pixels produced by a content aware fill for the portions of empty pixels.

12. A method as described in claim 6, wherein the user interface corresponds to an image editing application configured to provide multiple tools for editing images.

13. A method as described in claim 6, wherein the one or more preview images update in real-time responsive to manipulation of the crop frame to select different portions of the image.

14. A method as described in claim 6, further comprising controlling a size of the crop frame to automatically maintain at least one of image size, aspect ratio, or pixel resolution when the crop and fill operation is performed.

15. A system comprising:

a processing system including one or more hardware elements;

an image processing module operable via the processing system to perform image editing operations including:

ascertaining a position of a crop frame with respect to an image exposed for editing via a user interface of an image processing module;

recognizing one or more fill portions having empty pixels that are formed in accordance with the position of the crop frame;

exposing a user interface element to enable a selection from available crop operations including a combined crop and fill operation and a simple crop operation, the user interface element not being exposed until after ascertaining the position of the crop frame;

configuring the user interface element to simultaneously present preview images of the available crop operations;

detecting a selection of one of the available crop operations by selecting one of the corresponding preview images presented in the user interface element to cause the initiation of the selected crop operation; and rendering an output image in the user interface that is formed in accordance with the selection of the one of the available crop operations that is detected.

16. A system as described in claim 15, further comprising responsive to detecting the selection as a selection of the combined crop and fill operation, automatically performing a sequence of multiple operations for the crop and fill.

17. A system as described in claim 15, further comprising responsive to ascertaining the position of the crop frame, outputting a representation of an alternative crop frame that is configured to preserve an original image size corresponding to the image exposed for editing.

18. A system as described in claim 15, wherein the user interface corresponds to an image editing application configured to provide multiple tools for editing images.

19. A system as described in claim 15, wherein the output image is rendered to preserve an original image size corresponding to the image exposed for editing.

20. A system as described in claim 15, wherein the output image is rendered to preserve pixel data for the portion of the image within the crop frame and overall pixel resolution corresponding to the image exposed for editing.

* * * * *